(12) United States Patent
Martin et al.

(10) Patent No.: US 10,502,167 B2
(45) Date of Patent: Dec. 10, 2019

(54) SYSTEMS AND METHODS FOR PARTICULATE FILTER CLEANING

(71) Applicant: Ford Global Technologies, LLC, Dearborn, MI (US)

(72) Inventors: Douglas Raymond Martin, Canton, MI (US); Tyler Kelly, Plymouth, MI (US); Timothy Stolzenfeld, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/222,434

(22) Filed: Dec. 17, 2018

(65) Prior Publication Data

US 2019/0120180 A1  Apr. 25, 2019

Related U.S. Application Data

(63) Continuation of application No. 15/675,307, filed on Aug. 11, 2017, now Pat. No. 10,156,211.

(51) Int. Cl.
*F01N 3/00* (2006.01)
*F02M 26/35* (2016.01)
(Continued)

(52) U.S. Cl.
CPC ........... *F02M 26/35* (2016.02); *F01N 3/0211* (2013.01); *F01N 3/0233* (2013.01); *F01N 3/0238* (2013.01); *F01N 3/2093* (2013.01); *F02D 41/0007* (2013.01); *F02D 41/029* (2013.01); *F02D 41/1446* (2013.01); *F02D 41/1448* (2013.01); *F02M 26/34* (2016.02); *F01N 2590/11* (2013.01); *F02D 19/084* (2013.01); *F02D 41/0025* (2013.01); *F02D 41/042* (2013.01); *F02D 41/062* (2013.01); *F02D 2041/007* (2013.01);
(Continued)

(58) Field of Classification Search
CPC ........ F02M 26/35; F02M 26/34; F02M 26/04; F02M 26/22; F02D 41/1448; F02D 41/1446; F02D 41/029; F02D 41/0007; F02D 2200/0812; F02D 41/0025; F02D 41/062; F02D 41/042; F02D 19/084; F02D 2041/007; F02D 2041/0075; F01N 3/0233; F01N 3/0238; F01N 3/2093; F01N 3/0211; F01N 2590/11
See application file for complete search history.

(56) References Cited

U.S. PATENT DOCUMENTS

3,874,857 A   4/1975  Hunt et al.
4,916,897 A   4/1990  Hayashi et al.
(Continued)

*Primary Examiner* — Thomas N Moulis
(74) *Attorney, Agent, or Firm* — Geoffrey Brumbaugh; McCoy Russell LLP (57) ABSTRACT

Methods and systems are provided for cleaning an exhaust particulate filter by routing air via the exhaust particulate filter during a vehicle-off condition. In one example, during vehicle-off conditions, a turbocharger may be reverse rotated via an electric motor or an engine may be reverse rotated via an electric machine to route air via the exhaust particulate filter and the soot collected from the particulate filter may then be deposited on an air filter coupled to the intake manifold. During a subsequent engine start, the soot from the intake air filter may be routed to the engine cylinders for combustion.

20 Claims, 4 Drawing Sheets

(51) Int. Cl.
    *F02M 26/34*     (2016.01)
    *F02D 41/00*     (2006.01)
    *F01N 3/021*     (2006.01)
    *F01N 3/023*     (2006.01)
    *F01N 3/20*      (2006.01)
    *F02D 41/02*     (2006.01)
    *F02D 41/14*     (2006.01)
    *F02M 26/22*     (2016.01)
    *F02M 26/04*     (2016.01)
    *F02D 19/08*     (2006.01)
    *F02D 41/04*     (2006.01)
    *F02D 41/06*     (2006.01)

(52) U.S. Cl.
    CPC ............... *F02D 2041/0075* (2013.01); *F02D 2200/0812* (2013.01); *F02M 26/04* (2016.02); *F02M 26/22* (2016.02)

(56) References Cited

U.S. PATENT DOCUMENTS

| | | | |
|---|---|---|---|
| 5,566,545 A | 10/1996 | Hijikata et al. | |
| 5,725,618 A | 3/1998 | Shimoda et al. | |
| 5,930,994 A * | 8/1999 | Shimato | F01N 3/023 60/274 |
| 8,181,452 B2 * | 5/2012 | Bidner | F01N 3/30 60/295 |
| 8,863,505 B2 | 10/2014 | Santoso et al. | |
| 8,925,302 B2 * | 1/2015 | Ruona | F02B 37/183 60/274 |
| 9,458,812 B2 | 10/2016 | Santoso et al. | |
| 9,771,845 B2 | 9/2017 | Gonze et al. | |
| 9,938,913 B2 * | 4/2018 | Dudar | B60K 6/24 |
| 10,287,941 B2 * | 5/2019 | Zhang | B60T 17/02 |
| 10,344,644 B2 * | 7/2019 | Zsoldos | F02D 41/0255 |
| 2009/0025371 A1 | 1/2009 | Hermansson et al. | |
| 2011/0072792 A1 | 3/2011 | Bidner et al. | |
| 2011/0072796 A1 * | 3/2011 | Van Nieuwstadt | F01N 3/0238 60/285 |
| 2011/0072797 A1 * | 3/2011 | Van Nieuwstadt | F01N 3/0238 60/285 |
| 2013/0239802 A1 | 9/2013 | Troxell | |
| 2014/0165535 A1 * | 6/2014 | Gonze | F01N 3/0842 60/273 |
| 2015/0292399 A1 | 10/2015 | Kubes | |
| 2016/0053644 A1 | 2/2016 | Johansen et al. | |
| 2016/0265411 A1 * | 9/2016 | Tsukamoto | F01N 3/05 |
| 2016/0280203 A1 | 9/2016 | Yang et al. | |
| 2018/0058287 A1 | 3/2018 | Zhang | |

* cited by examiner

SYSTEMS AND METHODS FOR PARTICULATE FILTER CLEANING

CROSS REFERENCE TO RELATED APPLICATION

The present application is a continuation of U.S. patent application Ser. No. 15/675,307, entitled "SYSTEMS AND METHODS FOR PARTICULATE FILTER CLEANING," filed on Aug. 11, 2017. The entire contents of the above-referenced application are hereby incorporated by reference in its entirety for all purposes.

FIELD

The present description relates generally to methods and systems for cleaning an exhaust particulate filter during a vehicle-off condition.

BACKGROUND/SUMMARY

Engine combustion using gasoline fuel may generate particulate matter (PM) (such as soot and aerosols) that may be exhausted to the atmosphere. To enable emissions compliance, particulate filters (PF) may be included in the engine exhaust, to filter out exhaust PMs before releasing the exhaust to the atmosphere. Such devices may be periodically or opportunistically regenerated during operation of an engine to decrease the amount of trapped PM. However, a portion of the trapped PM may not burn during PF regeneration due to the geometry of the PF and/or location of the PF and accumulation of such unburnt PM may result in increased exhaust back pressure resulting in decreased engine efficiency. Also, conditions for PF regeneration may not be available during prolonged periods of vehicle operation, causing PF load to keep accumulating.

Various approaches are provided for cleaning a PF in response to PM loading reaching a threshold amount. In one example, as shown in U.S. Pat. No. 5,725,618, Shimoda et al. discloses a method to backwash a particulate filter coupled to an exhaust passage of a diesel engine. Pressurized air from an air chamber may be routed from downstream of the PF to upstream of the PF to generate a pressure for removal of the PM accumulated on the PF. The pressurized air containing the soot is then routes to a PM burning section, wherein the PM is burnt using electrical energy from a heater coupled to the burning section.

However, the inventors herein have recognized potential disadvantages with the above approach. As one example, additional components may be required to remove the accumulated soot from the PF and then to burn the soot, leading to increased cost. By using electrical energy from a separate heater to burn the soot, parasitic loss of engine power may increase. Also, backwashing PF during engine operation may result in soot entering the combustion chambers via the exhaust valve, thereby adversely affecting combustion stability. Further, engine operation with an increased exhaust temperature may adversely affect emissions quality.

In one example, the issues described above may be addressed by a method comprising: routing exhaust gases from an engine through a particulate filter (PF), and responsive to a higher than threshold exhaust particulate filter (PF) soot load and when the engine is no longer combusting, flowing ambient air through the PF and then routing the ambient air with soot collected from the PF to an intake manifold to deposit the soot on an air filter coupled to the intake manifold. In this way, during vehicle key-off, by opportunistically reverse rotating either an exhaust turbine of a turbocharger, or the engine, air may be routed via the PF in a reverse direction to remove soot accumulated on the PF and then to deposit the soot on the intake air filter to be subsequently routed to the engine cylinders for combustion.

As one example, during a vehicle key-off condition, in response to a higher than threshold PF soot load and a lower than threshold exhaust temperature, the controller may carry out a cleaning routine for the PF. A turbocharger including an exhaust turbine and an intake compressor may be rotated in a reverse direction via an electric motor coupled to the turbine. In response to the reverse rotation of the exhaust turbine, ambient air may enter the exhaust passage from the tailpipe and flow to the turbine via the PF. As the ambient air flows through the PF in a reserve direction (from downstream of the PF proximal to the tailpipe to upstream of the PF proximal to the turbine), soot accumulated on the PF may be removed with the air flow. The wastegate may be closed and an exhaust gas recirculation (EGR) valve coupled to a higher pressure EGR (HP-EGR) passage may be fully opened to route the ambient air with soot from downstream of the turbine to upstream of the intake compressor (proximal to the charge air cooler) via the turbine and the HP-EGR passage. The air with the soot may then be routed to upstream of the intake compressor (proximal to the intake air filter) via one of the compressor and a compressor recirculation passage. The air may then flow out of the intake passage to the atmosphere via the intake air filter, depositing the soot on the intake air filter and removing any particulate matter deposited on the intake filter. For a hybrid electric vehicle (HEV), during a vehicle key-off condition, in response to a higher than threshold PF soot load and a lower than threshold exhaust temperature, the engine may be reverse rotated using motor torque from an electric machine. Due to reverse rotation of engine, ambient air may enter via the tailpipe and while flowing through the PF may remove the accumulated soot. The air with the soot may then be routed to the intake air filter via the turbine, the engine cylinders, and the compressor recirculation passage. During an immediately subsequent engine start, the soot deposited on the intake air filter may be routed to the engine cylinders (for combustion) along with the intake air flow.

In this way, by leveraging an existing turbocharger or a HEV electric machine to clean the soot load deposited on a PF, the cost associated with adding supplemental engine components to be used for soot removal may be reduced. By cleaning the PF during vehicle key-off, the cleaning routine may be carried out opportunistically even during prolonged periods of vehicle operation without fulfillment of PF regenerating conditions. The technical effect of flowing air out of the intake passage via the intake air filter is that particulate matter deposited on the intake air filter may so be removed with the air flow, thereby allowing cleaning of both the PF and the intake air filter with the same air flow. By routing the soot to the engine cylinders for burning, exhaust temperature may not be increased during engine operation, thereby improving emissions quality, engine performance, and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
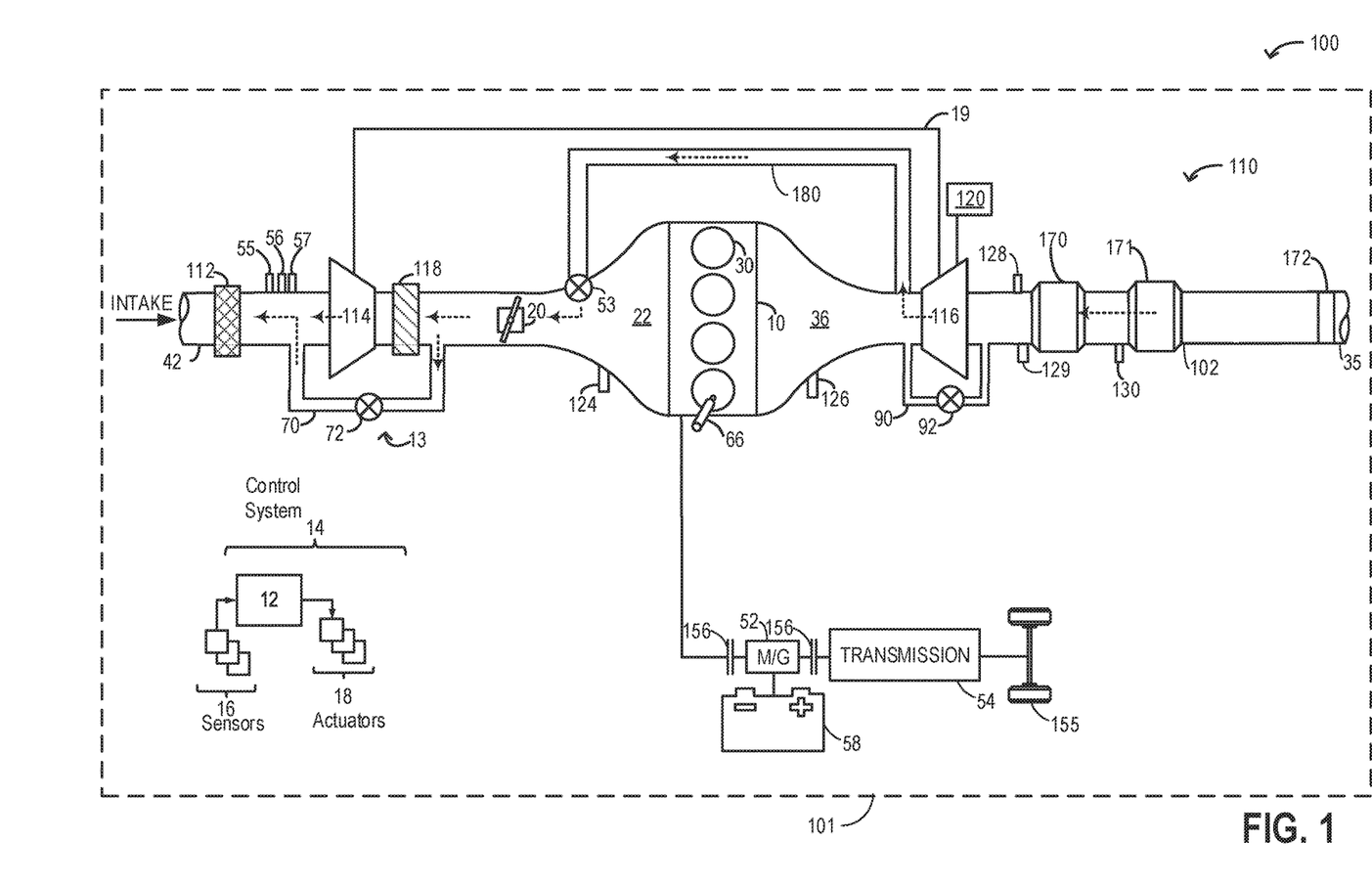
FIG. 1 shows an example embodiment of an engine system including an exhaust particulate filter (PF).

The following description relates to systems and methods for operating a turbocharger or a hybrid electric vehicle (HEV) electric machine during a vehicle-off condition for cleaning an exhaust particulate filter (PF). The PF may be coupled to an example engine system in a HEV as shown in FIG. 1. An engine controller may be configured to perform control routines, such as the example routines of FIGS. 2 and 3 to opportunistically clean the soot deposited on the PF and then subsequently route the soot to the engine cylinders via an intake air filter. An example cleaning of the PF is shown with reference to FIG. 4.

FIG. 1 shows a schematic view 100 of a vehicle system 101 with an example engine system 110 including an engine 10. In one example, the engine system 110 may be a diesel engine system. In one example, the engine system 110 may be a gasoline engine system. In the depicted embodiment, engine 10 is a boosted engine coupled to a turbocharger 13 including a compressor 114 driven by a turbine 116. Specifically, fresh air is introduced along intake passage 42 into engine 10 via intake air filter (air cleaner) 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust. The turbine 116 may be an electric-turbine operated using electrical energy from a battery of an electric motor 120 coupled to the turbine 116. As the turbine 116 is connected to the compressor via the shaft 19, upon electrically driving the turbine, the compressor may also be electrically operated. In one example, each of the turbine 116 and the compressor 114 may be rotated using motor torque (from motor 120) in a forward direction to increase boost pressure based on torque demand. In one example, each of the turbine 116 and the compressor 114 may be rotated using motor torque (from motor 120) in a reverse direction to flow in ambient air from the tailpipe 35 to the intake passage 42 via the turbine 116 and the compressor 114.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 11. In the embodiment shown in FIG. 1, the pressure of the air charge within the intake manifold 22 is sensed by manifold air pressure (MAP) sensor 124. A compressor recirculation passage 70 coupled in parallel with the intake compressor 114 to recirculate air via the compressor 114 based on engine boost demand. A compressor recirculation valve (CRV) 72 may be coupled to the compressor recirculation passage 70 to regulate air flow via the compressor recirculation passage 70.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator (valve) 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

Exhaust gas recirculation (EGR) delivery passage 180 may be coupled to the exhaust passage 102 upstream of turbine 116 to provide high pressure EGR (HP-EGR) to the engine intake manifold, downstream of compressor 114. An EGR valve 53 may be coupled to the HP-EGR passage 180 at the junction of the EGR passage 180 and the intake manifold 22. EGR valve 53 may be opened to admit a controlled amount of exhaust to the compressor outlet for desirable combustion and emissions control performance. EGR valve 53 may be configured as a continuously variable valve or as an on/off valve. In further embodiments, the engine system may include a low pressure EGR flow path wherein exhaust gas is drawn from downstream of turbine 116 and recirculated to the engine intake passage, upstream of compressor 114.

One or more sensors may be coupled to EGR passage 180 for providing details regarding the composition and condition of the HP-EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

As shown in FIG. 1, exhaust from the one or more exhaust manifold sections may be directed to turbine 116 to drive the turbine. The combined flow from the turbine and the wastegate then flows through emission control device 170. In one example, the first emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A particulate filter (PF) 171 is shown arranged along the exhaust passage 102 downstream of the exhaust after-treatment device 170. The particulate filter 171 may be a gasoline particulate filter or a diesel particulate filter. A substrate of the particulate filter 171 may be made of ceramic, silicon, metal, paper, or combinations thereof. During operation of the engine 10, particulate filter 171 may capture exhaust particulate matter (PMs), such as ash and soot (e.g., from unburned hydrocarbons) in order to reduce vehicle emissions. The soot may clog the surfaces of the particulate filter thereby creating an exhaust backpressure. The exhaust backpressure may negatively influence the engine efficiency. Once the particulate filter 171 becomes fully loaded with soot (e.g., soot load on the particulate filter exceeds a soot load threshold), the backpressure may be too high for proper exhaust expulsion. In order to avoid high backpressure, when the PF soot loading reaches a threshold load, the engine 10 may opportunistically clean the filter during an engine-off condition.

In one example, ambient air may be routed through the PF 171 in the reserve direction such as from a first end of the PF 171 proximal to a tailpipe 35 to a second end of the PF proximal to the exhaust turbine 116 and the ambient air may collect the soot or a portion of the soot deposited on the PF 171. Flowing ambient air through the PF in the reverse direction includes, reverse rotating the exhaust turbine 116 via the electric motor 120 coupled to the exhaust turbine 116. During reverse rotating the exhaust turbine, the wastegate valve 92 may be closed, the EGR valve 53 may be opened to order to route the ambient air with soot from downstream of the exhaust turbine 116 to downstream of an intake air compressor 114 via each of the exhaust turbine 116 and the EGR passage 180. From downstream of the intake air compressor 114, the ambient air may be routed to the intake air filter 112 via one of the intake air compressor 114 and the compressor recirculation passage 70. Routing air via the intake air compressor 114 includes responsive to a pressure difference across the intake air compressor 114 being higher than the pressure difference across the compressor recirculation valve 72, closing the compressor recirculation valve 72 to flow air via the intake air compressor 114, and routing air via the compressor recirculation passage 70 includes responsive to the pressure difference across the compressor recirculation valve 72 being higher than the pressure difference across the intake air compressor 114, opening the compressor recirculation valve 72 to flow air via the compressor recirculation passage 70.

As such, as air is routed from a first end of the air filter 112 proximal to the intake air compressor 114 to a second end of the air filter 112 proximal to an intake passage 42, particles accumulated on the air filter 112 may be removed to the atmosphere with the airflow. Dashed arrows shows the flow path of air from the tailpipe to the intake passage 42 via the PF 171 and the intake air filter 112. During an immediately subsequent engine start, soot deposited on the air filter 112 may be routed to the one or more engine cylinders with intake airflow from the intake passage to the one or more cylinders via the air filter, and thereafter the soot may be combusted. Details of a cleansing procedure for the PF is elaborated with reference to FIGS. 2 and 3.

A pressure sensor 130 may be coupled to the exhaust passage 102 upstream of the particulate filter 171 to estimate exhaust pressure. The controller may estimate the soot loading on the exhaust based on the exhaust pressure estimated via the sensor 130. A plurality of sensors, including an exhaust temperature sensor 128 and an exhaust oxygen sensor 129 may be coupled to the exhaust passage 102. The oxygen sensor may be linear oxygen sensors or UEGO (universal or wide-range exhaust gas oxygen), two-state oxygen sensors or EGO, HEGO (heated EGO), a $NO_x$, HC, or CO sensors. From downstream of the PF 171, exhaust may be released to the atmosphere via the muffler 172 and the tailpipe 35.

Engine system 110 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust oxygen sensor 129, exhaust pressure sensor 130, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 110. The actuators 18 may include, for example, throttle 20, EGR valve 53, wastegate valve 92, CRV 72, and fuel injector 66. The control system 14 may include a controller 12. The controller 12 may receive input data from the various sensors, process the input data, and trigger various actuators in response to the processed input data based on instruction or code programmed therein corresponding to one or more routines. For example, during an engine-off condition, based on a higher than threshold PF soot load, the controller 12 may send a signal to the electric motor 120 to reverse rotate turbine 116 to draw in ambient air via the PF 171 to remove the soot deposited on the PF 171. The controller 12 may then send a signal to the wastegate valve 92 and the EGR valve 53 to close the wastegate valve 92 and to open the EGR valve 53, respectively, in order to flow the ambient air with soot from the PF 171 to the intake air filter 112 via each of the turbine 116, the EGR passage 180, and the compressor 114.

In some examples, vehicle 101 may be a hybrid vehicle with multiple sources of torque available to one or more vehicle wheels 155. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 155 when one or more clutches 156 are engaged. In the depicted example, a first clutch 156 is provided between crankshaft 40 and electric machine 52, and a second clutch 156 is provided between electric machine 52 and transmission 54. Controller 12 may send a signal to an actuator of each clutch 156 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 155. Electric machine 52 may also be operated as a generator to provide electrical power to charge traction battery 58, for example during a braking operation. In one example, in response to a higher than threshold soot load on the particulate filter 171, during a vehicle-off condition, direction of rotation of the engine may be reversed by operating the electric machine 52. Reverse rotation of the engine allows air to flow from the first end of the PF 171 proximal to the tailpipe 35 to the second end of the PF 171 proximal to the exhaust turbine 116. As explained earlier, the reverse air flow via the PF 171 may remove the soot deposited on the PF 171 and then the air with the soot may be routed to the intake air filter 112 via the turbine 116, the engine cylinders, and the compressor recirculation passage 70.

In this way, the system of FIG. 1 enables a system for a hybrid vehicle comprising: a vehicle, an engine including one or more cylinders, an electric machine including a battery, an engine intake manifold including an intake air filter and a mass air flow sensor, an engine exhaust manifold including a particulate filter coupled to an exhaust passage, each of an exhaust pressure sensor and an exhaust temperature sensor coupled to the exhaust passage, a turbocharger including a compressor coupled to the engine intake manifold and a turbine coupled to the exhaust passage, the turbine further coupled to an electric motor, a wastegate including a wastegate valve coupled across the turbine, a compressor recirculation passage including a compressor recirculation valve coupled across the compressor, an exhaust gas recirculation (EGR) passage coupled to the exhaust passage and the intake manifold, the EGR passage including an EGR valve. The vehicle system further comprising a controller with computer readable instructions stored on non-transitory memory for: responsive to a higher than threshold soot deposited on the PF, during a vehicle key-off condition, routing air through the PF in a reverse direction to remove soot from the PF, and then routing air with soot to the intake air filter via either the EGR passage or the one or more cylinders, and one or more of the compressor and the compressor recirculation passage, and responsive to a subsequent engine restart, routing air through the intake air filter to remove the soot from the intake air filter to the one or more cylinders via the compressor.

Figure 2:
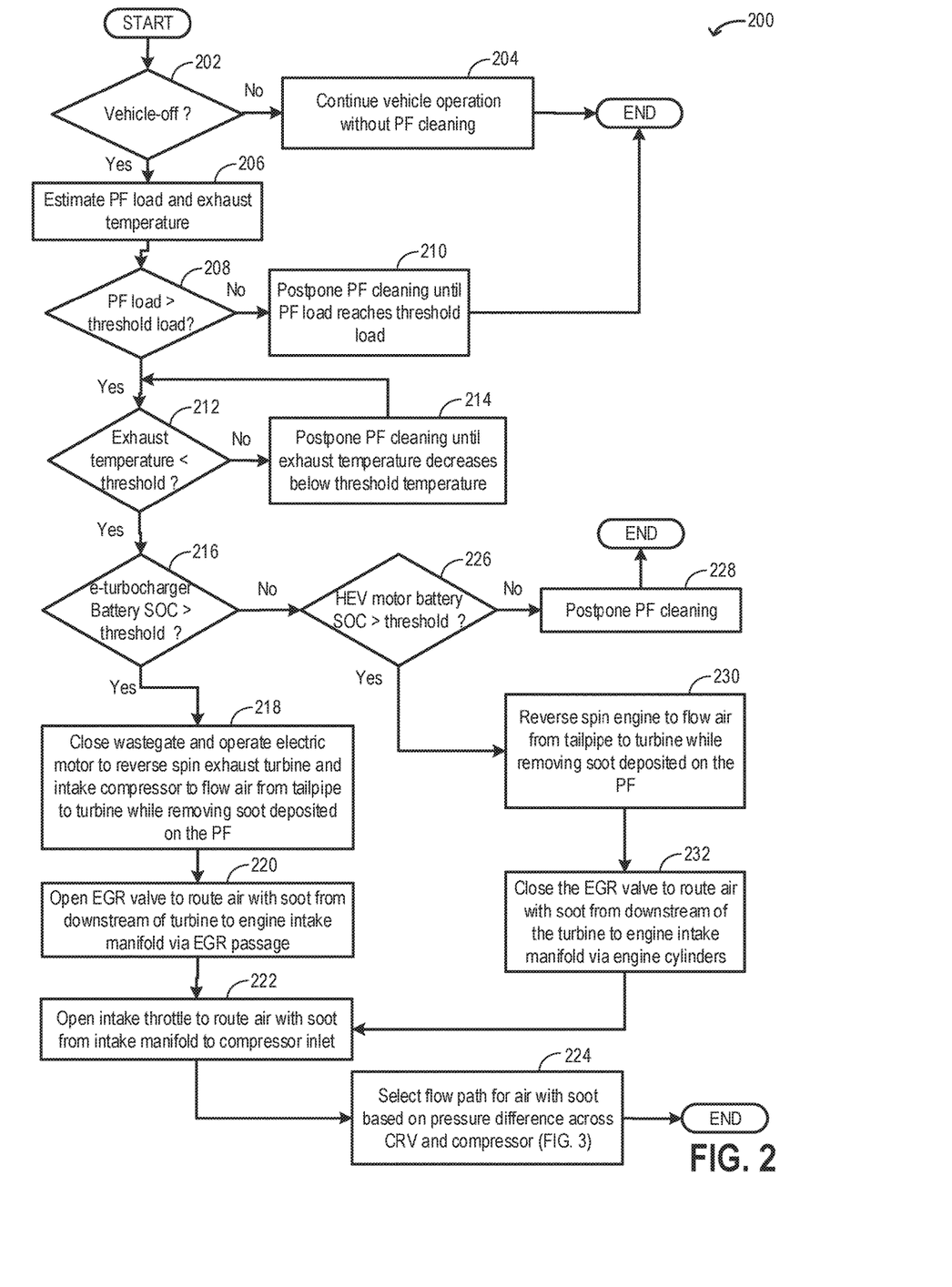
FIG. 2 shows a flow chart illustrating an example method that may be implemented for cleaning the PF.

FIG. 2 illustrates an example method 200 that may be implemented for cleaning a particulate filter (such as PF 171 of FIG. 1) coupled to an engine exhaust passage. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes determining if a vehicle-off condition is perceived. A vehicle-off condition may include a key-off condition, an engine-off event, a vehicle shutdown event, or other indication that the vehicle is no longer being propelled. In one example, a vehicle-off condition may be estimated and/or inferred from the position of a slot in the vehicle's keyhole, the position of an engine start/stop button, an engine ignition status as provided by the engine directly, and/or an ignition sensor, or any combination thereof. In a hybrid vehicle, the vehicle-off condition includes the electric machine coupled to the vehicle wheels being maintained in a deactivated state. Also, during a vehicle-off condition, the transmission may be in park and the vehicle brakes may be engaged.

If it is determined that a vehicle-off condition is not confirmed, at 204, the vehicle may be continued to be operated (such as propelled) using engine torque and/or motor torque and a PF cleaning routine may not be initiated. If a vehicle key-off condition is confirmed, at 206, the controller may determine PF soot load based on exhaust pressure as estimated via an exhaust pressure sensor (such as pressure sensor 130 in FIG. 1) coupled to the exhaust passage upstream of the PF. The controller may determine the PF load based on a calculation using a look-up table with the input being exhaust pressure and the output being PF load. Also, the controller may determine an exhaust temperature as estimated via an exhaust temperature sensor (such as exhaust sensor 128 in FIG. 1) coupled to the exhaust passage.

At 208, the routine includes determining if the PF soot load is greater than a threshold PF load. The threshold PF load may correspond to a threshold exhaust backpressure above which exhaust expulsion from cylinders may be adversely affected, thereby negatively influencing engine performance. The threshold load may be calibrated prior to engine-off based on empirically determined back-pressures. Alternatively, the threshold load may be calibrated during immediately prior engine operation based on a measured or a modeled exhaust back-pressure. If it is determined that PF soot load is lower than the threshold load, it may be inferred that during immediately subsequent engine operations, the exhaust back-pressure may not adversely affect engine operation. Therefore, at 210, PF cleaning may be postponed until the PF soot load reaches the threshold load.

If it is determined that the PF soot load is higher than the threshold load, at 212, the routine includes determining if the exhaust temperature is lower than a threshold temperature. The threshold temperature may be based on an exhaust temperature attained after completion of engine-off purge tests (such as diagnostic tests for the Evaporative Emission Control System). In order to reduce overlap between the PF cleaning routine and an engine-off purge tests, the controller may not initiate the PF cleaning routine until the exhaust temperature decreases below the threshold temperature. In one example, the controller may wait for a threshold duration (for example 4 hours) since engine-off before initiating the PF cleaning routine in order to allow sufficient time for completion of the purge tests and for the engine temperature to reduce below the threshold temperature.

If it is determined that the exhaust temperature is above the threshold temperature, at 214, PF cleaning may be postponed until the exhaust temperature decreases to below the threshold temperature. If it is determined that the exhaust temperature is lower than the threshold temperature, at 216, the routine includes determining if a state of charge (SOC) of a battery of an electric motor (such as motor 120 in FIG. 1) coupled to an electric turbocharger is higher than a threshold charge. The threshold charge may correspond to the minimum amount of charge required to operate the turbocharger at a desired speed for a threshold duration. In one example, the threshold duration may be based on the amount of time required to displace the entire engine intake air mass 10 times.

If it is determined that the SOC of the electric motor battery coupled to an electric turbocharger is higher than the threshold charge, at 218, the controller may send a signal to the electric motor in order to actuate the electric motor. The electric motor may reverse rotate the exhaust turbine (such as turbine 116 in FIG. 2) to draw in ambient air from the tailpipe to the turbine via the PF. In one example, reverse rotation of turbine includes rotating the turbine in an anti-clockwise direction. The controller may also send a signal to the wastegate valve (such as wastegate valve 92 in FIG. 1) coupled to a wastegate passage in order to close the wastegate valve such that the ambient air flowing in from the tailpipe may flow in via the PF and turbine. As ambient air flows through the PF in a reverse direction (such as from a first end of the PF proximal to the tailpipe to a second end of the PF proximal to the turbine), soot accumulated on the PF may be removed with the air stream and the ambient air along with the soot may flow to the turbine.

At 220, the controller may send a signal to the EGR valve (such as EGR valve 53 in FIG. 1) to actuate the EGR valve to a completely open position. As the engine is not operating during the PF cleaning routine, the intake and exhaust valves may be closed. The ambient air along with the soot may then flow from downstream of the turbine to upstream of the intake throttle via the EGR passage (such as HP-EGR passage 180 in FIG. 1).

At 222, the controller may send a signal to the intake throttle to actuate the intake throttle to a completely open position in order to route the ambient air along with the soot to an inlet of an intake compressor (such as compressor 114 in FIG. 1). In one example, the inlet of the intake compressor may be a first end of the compressor proximal to the intake throttle. Since the compressor is coupled to the exhaust turbine via a shaft, as the exhaust turbine is reverse rotated using power from the electric motor coupled to the turbine, the compressor may also reverse rotate. In one example, reverse rotation of compressor includes rotating the compressor in an anti-clockwise direction. Reverse rotation of the compressor further facilitates air flow from the exhaust passage to the inlet of the intake compressor. Once the ambient air along with the soot reaches the compressor inlet, at 224, the flow path of the ambient air along with the soot may be determined based on a pressure difference (drop) across the compressor and a pressure difference (drop) across a compressor recirculation valve coupled to a compressor recirculation passage. In one example, pressure drop across the intake air compressor is a function of rotational speed of the intake air compressor, and the pressure drop across the compressor recirculation valve is a function of each of an atmospheric pressure and an intake manifold pressure. The selection of the flow path is elaborated with reference to FIG. 3.

Returning to step 216, if it is determined that the SOC of the battery of the electric motor coupled to an electric turbocharger is lower than a threshold charge, at 226, the routine includes determining if the state of charge (SOC) of the battery of the electric machine (such as electric machine 52 in FIG. 1) coupled to the hybrid electric vehicle (HEV) is higher than a threshold charge. The HEV electric machine may be coupled to each of the engine and the vehicle wheels and the machine may provide power to propel the vehicle. The HEV electric machine is also capable to rotating the engine such as by mechanically rotating the crankshaft. For the battery of the HEV electric machine, the threshold charge may correspond to the minimum energy required to rotate (crank) the engine at a nominal cranking speed (such as at engine idling speed).

If it is determined that the battery SOC of the HEV electric machine is lower than the threshold charge, at 228, PF cleaning may be postponed until at least the immediately subsequent vehicle-off condition. If it is determined that the battery SOC of the HEV electric machine is higher than the threshold charge, at 230, the controller may send a signal to the HEV electric machine in order to rotate the crankshaft in a reverse direction such that the engine may spin in a reverse direction. Reverse spinning the crankshaft includes spinning the crankshaft in a direction opposite to the direction of crankshaft motion resulting from cylinder combustion. In one example, as a result of combustion, if the direction of crankshaft motion is clockwise, then during reverse rotation of the crankshaft (and consequently the engine), the direction of crankshaft motion will be anti-clockwise. As the engine is reverse rotated, the engine valves such as the exhaust valve and the intake valve may operate (open and close) in a reverse order such as the exhaust valve opening prior to the opening of the intake valve. As the engine valves operate in a reserve order, a low pressure may be created in the engine cylinders and the exhaust manifold, thereby drawing in ambient air from the tailpipe to the exhaust turbine via the PF. In one example, the controller may also send a signal to the wastegate valve (such as wastegate valve 92 in FIG. 1) coupled to a wastegate passage in order to close the wastegate valve such that the ambient air flowing in from the tailpipe may flow in via the turbine. In another example, as the engine is being reverse rotated by the electric machine, the wastegate valve may be maintained in a closed position with ambient air flowing from the PF to the engine. As ambient air flows through the PF in a reverse direction (such as from the first end of the PF proximal to the tailpipe to the second end of the PF proximal to the turbine), soot accumulated on the PF may be removed with the air stream and the ambient air along with the soot may flow to the turbine.

At 232, the controller may send a signal to the EGR valve to actuate the EGR valve to a completely closed position. As the engine is rotated using HEV electric machine energy, the exhaust valves and intake valves open to provide a route for the ambient air along with the soot to flow from the exhaust manifold to the intake manifold. The ambient air along with the soot may then enter the engine cylinders from downstream of the turbine via the exhaust valves and the exit the engine cylinders via the intake valves and then flow to upstream of the intake throttle. The engine cylinders provide a wider flow path for the ambient air along with the soot compared to the EGR passage. The routine may then proceed to step 222 wherein, as described before, the intake throttle may be opened to route the ambient air along with soot from the intake manifold to the compressor inlet.

Figure 3:
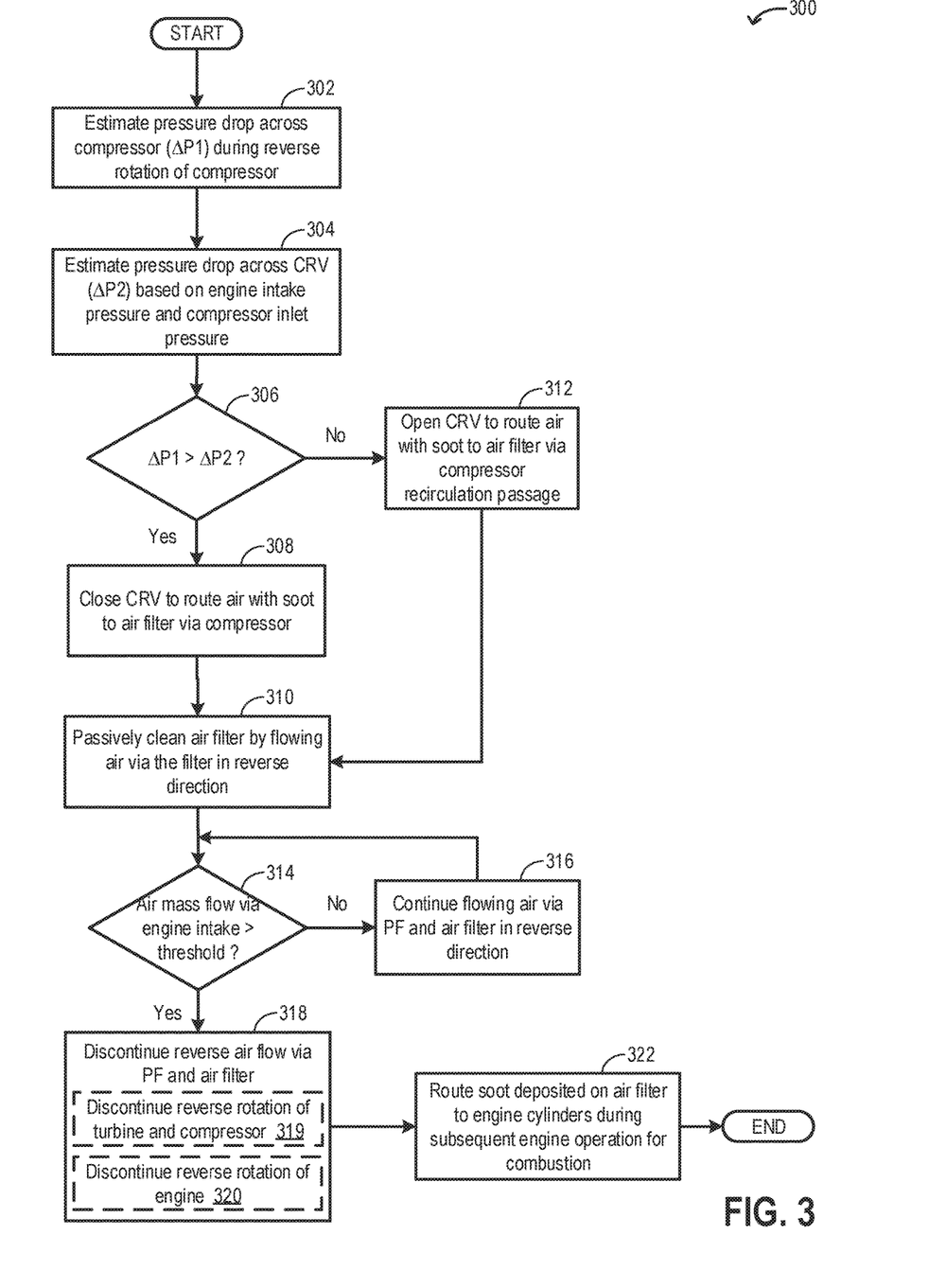
FIG. 3 shows a flow chart illustrating an example method that may be implemented for routing soot from the PF to the engine cylinders via an intake air filter.

FIG. 3 illustrates an example method 300 that may be implemented for routing soot from the PF to the engine cylinders via an intake air filter. Example method 300 may be a part of the method 200 and may be carried out at step 224 in FIG. 2.

At 302, a pressure drop across the intake compressor ($\Delta P1$) may be estimated during the reverse rotation of the compressor. In one example, the controller may estimate $\Delta P1$ as a function of one or more of the speed of rotation of the compressor, the compressor inlet pressure, and the engine intake manifold pressure. In another example, the controller may determine $\Delta P1$ based on a calculation using a look-up table with the input being each of the speed of rotation of the compressor, the compressor inlet pressure, and the engine intake manifold pressure, and the output being $\Delta P1$. As such, the controller may determine the speed of rotation of the compressor based on a calculation using a look-up table with the input being the output of the electric motor coupled to the exhaust turbine used to spin the turbocharger and the output being the speed of rotation of the compressor. The compressor inlet pressure sensor may be estimated based on input from a compressor inlet pressure sensor coupled to the intake passage downstream of the intake air filter (such as compressor inlet pressure sensor 56 in FIG. 1). The engine intake manifold pressure sensor may be estimated based on input from a manifold air pressure sensor coupled to the intake manifold downstream of the charge air cooler (such as MAP sensor 124 in FIG. 1). As such, estimation of $\Delta P1$ may be carried out during reserve rotation of the turbocharger via the electric motor coupled to the exhaust turbine and if the engine is reverse rotated using power from the HEV electric machine battery, the compressor may not rotate and the controller may not estimate $\Delta P1$.

At 304, a pressure drop ($\Delta P2$) across the compressor recirculation valve (such as CRV 72 in FIG. 1) coupled to the compressor recirculation passage (such as compressor recirculation passage 70 in FIG. 1) may be estimated. In one example, the controller may estimate $\Delta P2$ as a function of one or more of the atmospheric pressure, the compressor inlet pressure and the engine intake manifold pressure. In another example, the controller may determine $\Delta P2$ based on a calculation using a look-up table with the input being each of the atmospheric pressure, the compressor inlet pressure and the engine intake manifold pressure, and the output being $\Delta P2$. The compressor inlet pressure may be estimated based on input from a compressor inlet pressure sensor coupled to the intake passage downstream of the intake air filter. The engine intake manifold pressure may be estimated based on input from a manifold air pressure sensor coupled to the intake manifold downstream of the charge air cooler.

At 306, the routine includes determining if pressure drop across the intake compressor ($\Delta P1$) is higher than the pressure drop across the CRV ($\Delta P2$). A higher pressure drop across the compressor or CRV allows for an improved air flow from upstream of the compressor to the intake air filter. If it is determined that $\Delta P2$ is higher than $\Delta P1$, at 312, the controller may send a signal to the CRV to completely open the CRV in order to route the ambient air along with soot from downstream of the compressor to the intake air filter via the compressor recirculation passage. In this way, routing the air with soot via the compressor recirculation passage includes routing air from downstream of the intake air compressor to the intake air filter via the compressor recirculation passage responsive to the pressure drop across the compressor recirculation valve being higher than the pressure drop across the intake air compressor.

In one example, even when the CRV is completely opened, a portion of the ambient air with the soot may flow from downstream of the compressor to the intake air filter via the compressor while the remaining portion of the ambient air and the soot may flow via the compressor recirculation passage. As such, if the engine is reverse rotated using power from the HEV electric machine battery, the compressor may not rotate and there may not be any significant pressure drop across the compressor and ambient air may be solely routed via the compressor recirculation passage (by opening the CRV).

If it is determined that $\Delta P1$ is higher than $\Delta P2$, at 308, the controller may send a signal to the CRV to completely close the CRV in order to route the entire volume of ambient air along with soot from downstream of the compressor to the intake air filter via the compressor. The pressure drop across the compressor, caused by reverse rotation of the compressor, facilitates air flow (along with soot) from downstream of the compressor to the intake air filter. In this way, routing the air with soot via the intake air compressor includes routing air from downstream of the intake air compressor to the intake air filter via the intake air compressor responsive to a pressure drop across the intake air compressor being higher than the pressure drop across a compressor recirculation valve coupled to the compressor recirculation passage, the intake air compressor driven by the exhaust turbine.

Once the ambient air along with the soot reaches the intake air filter, the soot may be deposited on a first side of the intake air filter, proximal to the compressor, while air flows from the first side of the filter to a second side of the filter, proximal to the intake passage. As the ambient air flows across the intake air filter on its way out of the engine system via the intake passage, at 310, the intake air filter may be passively cleaned. During engine operation, as air flows in to the intake manifold via the intake air filter, particulate matter from air may be deposited on the second side of the intake air filter (proximal to the intake passage). Due to the reverse air flow from the first side of the filter to the second side, particulate matter deposited on the second side of the intake air filter may be removed to the atmosphere along with the air flow.

At 314, the routine includes determining if the total air mass flow via the engine intake manifold is higher than a threshold air mass. The threshold air mass may correspond to the amount of air displacement desired to clean each of the PF and the intake air filter. In one example, the threshold air mass may be the amount of air required for displacing the entire engine intake mass ten times. The air mass flow may be determined based on input from an intake manifold air pressure (MAP) sensor and an intake manifold air flow (MAF) sensor.

If it is determined that the total air mass flow via the engine intake manifold is lower than the threshold air mass, at 316, the controller may continue to reverse spin the turbocharger (via electric motor coupled to exhaust turbine) or the engine (via HEV electric machine) to flow air via each of the PF and the air filter in reverse directions. Reverse flow of air via the PF include flowing air from the first end of the PF proximal to the tailpipe to a second end of the PF proximal to the turbine and reverse flow of air via the intake air filter include flowing air from the first side of the intake air filter, proximal to the compressor, to the second side of the filter, proximal to the intake passage.

If it is determined that the total air mass flow via the engine intake manifold is higher than the threshold air mass, at 318, reverse flow of air via the PF and the air filter may be discontinued. Discontinuing reverse air flow via the PF and the air filter includes, at 319, discontinuing reverse rotation of the exhaust turbine and the intake compressor via the electric motor coupled to the turbine, thereby suspending spinning of the turbine and the compressor. The controller may send a signal to the actuator of the electric motor coupled to the turbine to switch off the electric motor. As the spinning of the turbine and the compressor stops, air flow from the tailpipe to the intake passage via the PF and the intake air filter is suspended. Discontinuing reverse air flow via the PF and the air filter may include, at 320, discontinuing reverse rotation of the engine via the electric machine of the HEV. The controller may send a signal to the actuator of the electric machine of the HEV to switch off the electric machine, thereby suspending reverse rotation of the engine. As the reverse spinning of the engine stops, air flow from the tailpipe to the intake passage via the PF and the intake air filter is suspended. In this way, during routing air through the PF in a reverse direction, mass air flow via the engine intake manifold may be estimated based on inputs from the mass air flow sensor, and in response to a higher than threshold mass air flow via the engine intake manifold, rotation of each of the turbine and the compressor may be suspended or rotation of the engine may be stopped.

At 322, during an immediately subsequent engine operation wherein the engine is fueled and combustion is carried out in the engine cylinders to generate engine torque, soot deposited on the intake air filter may be routed to the engine cylinders for combustion. As described previously, the soot from the PF may be deposited on the first side of the intake air filter proximal to the compressor as air flows out of the intake passage via the intake air filter during the PF cleaning routine. During the immediately subsequent engine operation after the PF cleaning routine, when the compressor is rotated in the forward direction, air may flow into the engine intake manifold via the intake air filter and the soot from the filter may be routed to the engine cylinders via the cylinder intake valves. At the engine cylinders, the soot may be burned at the high combustion temperature.

In this way, during an engine-off condition, particulate matter from an exhaust particulate filter (PF) may be deposited to an intake air filter by flowing air from a tailpipe to the intake air filter via the PF, the air routed from the tailpipe to the intake air filter by reverse rotation of each of an exhaust turbine and an intake air compressor, driven by the turbine, via an electric motor coupled to the turbine, and during a subsequent combustion event, the particulate matter deposited on the intake air filter may be routed to engine cylinders for combustion.

Figure 4:
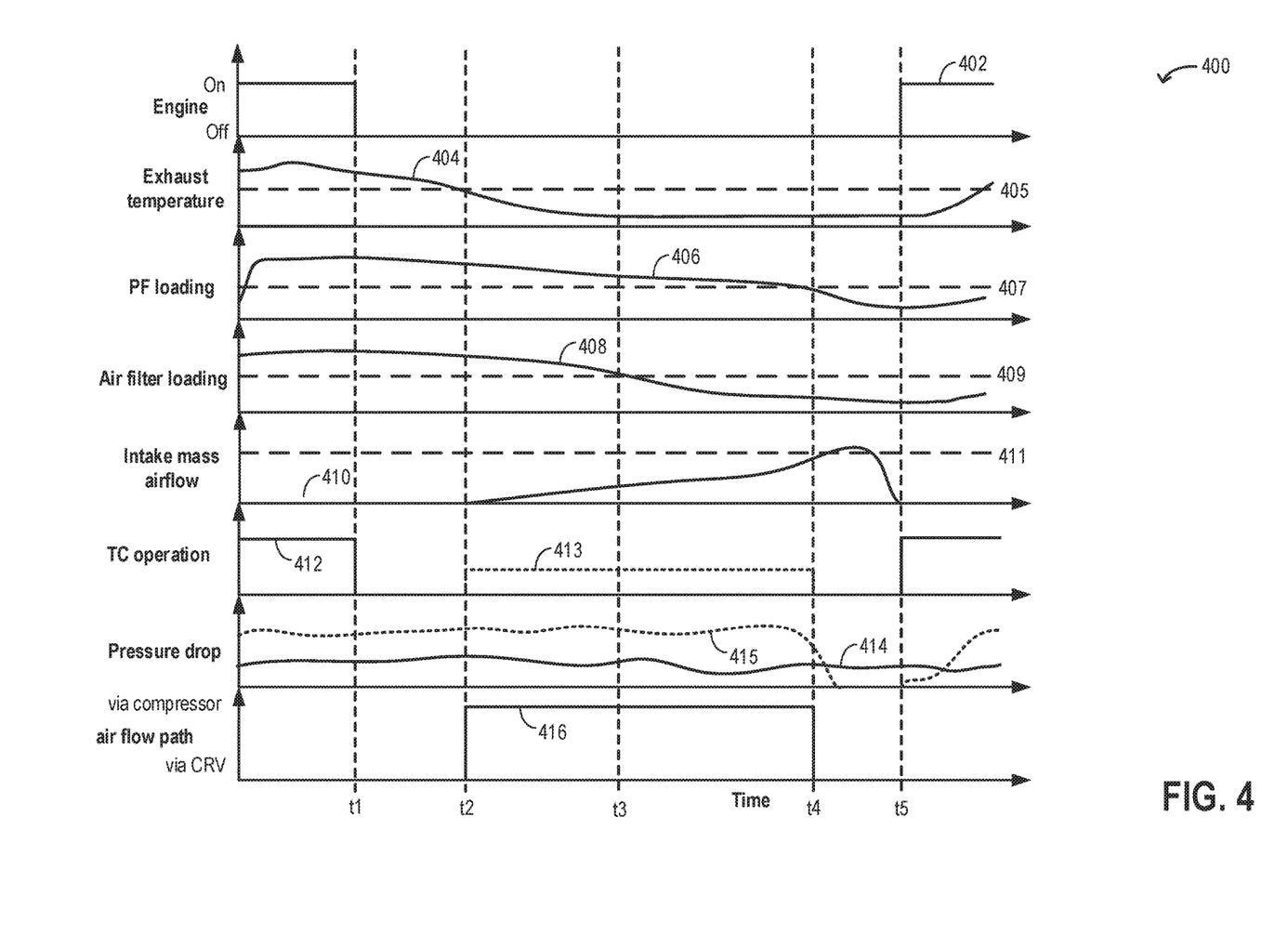
FIG. 4 shows an example cleaning of the PF, according to the present disclosure.

FIG. 4 shows an example operating sequence 400 illustrating a cleaning routine of an exhaust particulate filter (PF) carried out during vehicle-off conditions. The horizontal (x-axis) denotes time and the vertical markers t1-t5 identify significant times in the PF cleaning routine.

The first plot, line 402, shows engine operation. The second plot, line 404, shows engine exhaust temperature as estimated via an engine exhaust temperature sensor (such as exhaust temperature sensor 128 in FIG. 1). Dashed line 405 denotes a threshold exhaust temperature above which the PF cleaning routine may not be carried out. The third plot, line 406, shows soot loading on the PF as estimated via an exhaust pressure sensor (such as exhaust pressure sensor 130 in FIG. 1) coupled upstream of the PF. Dashed line 407 denotes a threshold PF soot load above which PF cleaning is desired. The fourth plot, line 408, shows particulate matter loading on an intake air filter as estimated based on a compressor inlet pressure sensor (such as pressure sensor 56 in FIG. 1). Dashed line 409 denotes a threshold intake air filter loading above which the air filter is desired to be cleaned. The fifth plot, line 410, shows an amount of mass airflow via the engine intake manifold as estimated via an intake mass air flow sensor. Dashed line 411 denotes a threshold mass airflow via the intake manifold which results in cleaning of each of the PF and the air filter. The sixth plot, line 412, shows operation of a turbocharger including an exhaust turbine and an intake compressor in a first, forward direction. Dotted line 413 shows operation of the turbocharger in a second, reverse direction, the second direction opposite to the first direction. The seventh plot, line 414, shows a pressure drop across a compressor recirculation valve (CRV) coupled to a compressor recirculation passage. Dotted line 415 denotes a pressure drop across the intake compressor. The eighth plot, line 416, shows a flow path for air during execution of the PF cleaning routine.

Prior to time t1, the engine may be operational (on) and the vehicle is propelled using engine torque. Each of the exhaust turbine and the intake compressor are operated in the first, forward direction to provide a desired boost pressure. Due to the forward rotation of the turbocharger, ambient air enters the engine via the intake passage, then successively flows through each of the compressor, the engine cylinders, the exhaust turbine, the PF before being released to the atmosphere via the tailpipe. During combustion, residuals (soot) are deposited on the PF and the PF soot load increases to above the threshold soot load 405. In one example, the threshold 405 may be calibrated prior to engine operation based on empirically determined back-pressures. Alternatively, threshold 405 may be calibrated during engine operation based on measured or modeled exhaust back-pressure. Once the PF load increases to above the threshold 405, reduction of PF load is desired to reduce the corresponding exhaust back pressure.

At time t1, in response to a vehicle key-off, the engine is switched off. The engine valves are actuated to respective closed position and fueling and spark is suspended. During the engine-off condition, in response to the higher than threshold PF soot load, a PF cleaning is desired at time t1. However, between time t1 and t2, based on the higher than threshold 405 engine exhaust temperature, it is inferred that engine-off purge tests are being carried out and the PF cleaning routine is not initiated. In one example, the threshold temperature 405 may be calibrated during the engine-off condition based on an exhaust temperature attained after completion of engine-off purge tests (such as diagnostics tests for the Evaporative Emission Control system).

At time t2, in response to the exhaust temperature decreasing below the threshold temperature 405, it is inferred that the engine-off purge tests are complete and the PF cleaning routine is initiated. In order to carry out the PF cleaning routine, between t2 and t3, the controller sends a signal to actuate an electric motor coupled to the exhaust turbine such that power from the electric motor is used to reverse rotate (in the second direction) the exhaust turbine. Since the turbine is coupled to the intake compressor via a shaft, reverse rotation of the turbine also causes the compressor to rotate in the second, reverse rotation. Due to the reverse rotation of the turbine, air enters the exhaust passage via the tailpipe and flows through the PF in a reverse direction (such as from a first end of the PF proximal to the tailpipe to a second end of the PF proximal to the turbine). As the air flows through the PF in the reverse direction soot accumulated on the PF is removed with the air stream and the air along with the soot flows to the turbine. After flowing through the turbine, air with soot is routed to the intake manifold via an exhaust gas recirculation passage. Between time t2 and t3, the pressure drop across the compressor (due to reverse rotation of the compressor) is higher than the pressure drop across the CRV. Therefore, the controller sends a signal to the CRV to actuate the CRV to a closed position such that the air with soot is routed from downstream of the compressor to upstream of the compressor via the compressor.

Once the ambient air along with the soot reaches the intake air filter, the soot is deposited on a first side of the intake air filter, proximal to the compressor, while air flows from the first side of the filter to a second side of the filter, proximal to the intake passage. Due to the reverse air flow from the first side of the intake air filter to the second side, particulate matter deposited on the second side of the intake air filter is removed to the atmosphere along with the air flow. Therefore, between t2 and t3, each of the soot load on the PF and the particulate matter load on the intake air filter progressively decreases.

At time t3, the air filter load decreases to below the threshold 409 indicating completion of intake air filter cleaning. In one example, the threshold 409 may be calibrated during the PF cleaning routine based on measured or modeled intake system back-pressures. However, the intake mass air flow remains below the threshold 411 indicating that the PF soot load has not reduced to below the threshold load 407. In one example, the threshold 411 may be calibrated during the PF cleaning routine based on each of the threshold PF load 407 and the intake air filter threshold load 409. Therefore, between time t3 and t4, the turbocharger is continued to be rotated in the reverse direction to flow air via the PF in the reverse direction, thereby removing soot deposited on the PF.

At time t4, the intake mass air flow increases to above the threshold 411 and the PF soot load decreases to below the threshold 707. Based on the lower than threshold 411 PF soot load and the lower than threshold 409 intake air filter loading, it is inferred that further cleaning of PF and/or the intake air filter is not desired and consequently at time t4, the controller sends a signal to suspend operation of the electric motor coupled to the exhaust turbine such that reverse rotation of the exhaust turbine stops. Since the compressor is driven by the turbine, as the rotation of the turbine is stopped, the rotation of the compressor also stops. Between time t4 and t5, the vehicle is not propelled and the engine is not operated.

At time t5, in response to a vehicle key-on and subsequent torque demand, the engine is switched on. The engine valves are actuated to respective open positions and fueling and spark is resumed. After time t5, each of the exhaust turbine and the intake compressor are operated in the first, forward direction to provide a desired boost pressure. As intake air flows to the engine cylinders via the intake air filter (from the second side of the intake air filter to the first side of the intake air filter), soot deposited on the first side of the intake air filter is routed (along with the intake air flow) from the intake air filter to the engine cylinders, and during combustion, the soot may be burnt at the cylinders. In this way, soot from the PF may be first deposited on the intake air filter and then routed to the engine cylinders for combustion.

In this way, by opportunistically reversing air flow via the exhaust particulate filter and the intake air filter, both the engine system filters may be concurrently cleaned. By using existing vehicle system components such as the turbocharger or the HEV electric machine to clean the PF, the cost associated with adding supplemental vehicle components to be used for soot removal may be reduced. The technical effect of routing the soot to the engine cylinders for combustion is that exhaust temperature may not be increased during engine operation, thereby improving emissions quality, engine performance, and fuel economy.

An example method comprises: routing exhaust gases from an engine through a particulate filter (PF), and responsive to a higher than threshold exhaust particulate filter (PF) soot load and when the engine is no longer combusting, flowing ambient air through the PF and then routing the ambient air with soot collected from the PF to an intake manifold to deposit the soot on an air filter coupled to the intake manifold. In any preceding example, additionally or optionally, flowing ambient air through the PF includes, reverse rotating an exhaust turbine via an electric motor coupled to the exhaust turbine to flow air from a first end of the PF proximal to a tailpipe to a second end of the PF proximal to the exhaust turbine. In any or all of the preceding examples, additionally or optionally, the engine is coupled to a hybrid vehicle, the hybrid vehicle propelled by either the engine or an electric machine. In any or all of the preceding examples, additionally or optionally, flowing ambient air through the PF includes, reversing direction of rotation of the engine by the electric machine to flow air from the first end of the PF proximal to the tailpipe to the second end of the PF proximal to the exhaust turbine. In any or all of the preceding examples, additionally or optionally, routing the ambient air with soot collected from the PF to the intake manifold includes, during reverse rotating the exhaust turbine, closing a wastegate valve positioned in parallel with the turbine, opening an exhaust gas recirculation (EGR) valve coupled to an EGR passage coupled between the intake manifold and an engine exhaust manifold, routing the ambient air with soot from downstream of the exhaust turbine to downstream of an intake air compressor via each of the exhaust turbine and the EGR passage, and then routing the ambient air with soot from downstream of the intake air compressor to the air filter via one of the intake air compressor and a compressor recirculation passage coupled in parallel with the intake air compressor. In any or all of the preceding examples, additionally or optionally, routing the air with soot via the intake air compressor includes routing air from downstream of the intake air compressor to the intake air filter via the intake air compressor responsive to a pressure drop across the intake air compressor being higher than the pressure drop across a compressor recirculation valve coupled to the compressor recirculation passage, the intake air compressor driven by the exhaust turbine. In any or all of the preceding examples, additionally or optionally, routing the air with soot via the compressor recirculation passage includes routing air from downstream of the intake air compressor to the intake air filter via the compressor recirculation passage responsive to the pressure drop across the compressor recirculation valve being higher than the pressure drop across the intake air compressor. In any or all of the preceding examples, additionally or optionally, the pressure drop across the intake air compressor is a function of rotational speed of the intake air compressor, and the pressure drop across the compressor recirculation valve is a function of each of an atmospheric pressure and an intake manifold pressure. In any or all of the preceding examples, additionally or optionally, routing the ambient air with soot collected from the PF to an intake manifold includes, during reversing direction of rotation of the engine, closing the EGR valve, routing the ambient air with soot from downstream of the exhaust turbine to downstream of the intake air compressor via one or more engine cylinders, and then routing the ambient air with soot from downstream of the intake air compressor to the air filter via the compressor recirculation passage. In any or all of the preceding examples, the method further comprises, additionally or optionally, routing air from a first end of the air filter proximal to the intake air compressor to a second end of the air filter proximal to an intake passage to remove particles accumulated on the air filter. In any or all of the preceding examples, the method further comprises, additionally or optionally, during an immediately subsequent engine start, routing soot deposited on the air filter to the one or more engine cylinders with intake airflow from the intake passage to the one or more cylinders via the air filter.

Another engine example method comprises: during an engine-off condition, depositing particulate matter from an exhaust particulate filter (PF) to an intake air filter by flowing air from a tailpipe to the intake air filter via the PF, the air routed from the tailpipe to the intake air filter by reverse rotation of each of an exhaust turbine and an intake air compressor, driven by the turbine, via an electric motor coupled to the turbine, and during a subsequent combustion event, routing the particulate matter deposited on the intake air filter to engine cylinders for combustion. In any preceding example, additionally or optionally, flowing air from the tailpipe to the intake air filter includes flowing air from the tailpipe to the intake air compressor via each of the PF, the exhaust turbine, and an exhaust gas recirculation (EGR) passage, coupled between an exhaust manifold and an intake manifold of the engine, and then flowing air to the intake air filter via one of the intake air compressor and a compressor recirculation passage coupled in parallel with the intake air compressor. In any or all of the preceding examples, additionally or optionally, flowing air via the intake air compressor includes responsive to a pressure difference across the intake air compressor being higher than the pressure difference across a compressor recirculation valve coupled to the compressor recirculation passage, closing the compressor recirculation valve to flow air via the intake air compressor, and wherein flowing air via the compressor recirculation passage includes responsive to the pressure difference across the compressor recirculation valve being higher than the pressure difference across the intake air compressor, opening the compressor recirculation valve to flow air via the compressor recirculation passage. In any or all of the preceding examples, additionally or optionally, depositing particulate matter from the PF to the intake air filter includes, in response to a higher than threshold particulate matter load on the PF, routing air from a first end of the PF proximal to the tailpipe to a second end of the PF proximal to the exhaust turbine while collecting particulate matter accumulated on the second end of the PF, and then routing the air with particulate matter to the intake air filter. In any or all of the preceding examples, the method further comprises, additionally or optionally, removing particulate matter from the intake air filter to atmosphere via an intake passage by flowing air from the intake air compressor to the intake passage via the intake air filter.

In yet another example, a hybrid vehicle system comprises: a vehicle, an engine including one or more cylinders, an electric machine including a battery, an engine intake manifold including an intake air filter and a mass air flow sensor, an engine exhaust manifold including a particulate filter coupled to an exhaust passage, each of an exhaust pressure sensor and an exhaust temperature sensor coupled to the exhaust passage, a turbocharger including a compressor coupled to the engine intake manifold and a turbine coupled to the exhaust passage, the turbine further coupled to an electric motor, a wastegate including a wastegate valve coupled across the turbine, a compressor recirculation passage including a compressor recirculation valve coupled across the compressor, an exhaust gas recirculation (EGR) passage coupled to the exhaust passage and the intake manifold, the EGR passage including an EGR valve, and a controller with computer readable instructions stored on non-transitory memory for: responsive to a higher than threshold soot deposited on the PF, during a vehicle key-off condition, routing air through the PF in a reverse direction to remove soot from the PF, and then routing air with soot to the intake air filter via either the EGR passage or the one or more cylinders, and one or more of the compressor and the compressor recirculation passage, and responsive to a subsequent engine restart, routing air through the intake air filter to remove the soot from the intake air filter to the one or more cylinders via the compressor. In any preceding example, additionally or optionally, routing air through the PF in the reverse direction includes flowing air from a tailpipe to the intake air filter via the PF. In any or all of the preceding examples, additionally or optionally, routing air through the PF in a reverse direction is carried out by either reversing direction of rotation of each of the turbine and the compressor via the electric motor coupled to the turbine, the compressor driven by the turbine, or by reversing direction of rotation of the engine via the electric machine. In any or all of the preceding examples, additionally or optionally, the controller contains further instructions for: during routing air through the PF in a reverse direction, estimating mass air flow via the engine intake manifold based on inputs from the mass air flow sensor, and in response to a higher than threshold mass air flow via the engine intake manifold, suspending rotation of each of the turbine and the compressor or suspending rotation of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
routing exhaust gases from an engine through a particulate filter (PF); and
flowing ambient air from an exhaust outlet through the PF; and then
routing the ambient air from the PF through an air filter of an intake manifold.

2. The method of claim 1, wherein flowing ambient air from an exhaust outlet is in response to a higher than threshold exhaust particulate filter (PF) soot load and the engine not combusting.

3. The method of claim 1, further including rotating an exhaust turbine in a reverse direction to flow the ambient air.

4. The method of claim 3, further including spinning the exhaust turbine with an electric motor.

5. The method of claim 1, wherein flowing the ambient air further comprises closing a wastegate valve and opening an exhaust gas recirculation (EGR) valve.

6. The method of claim 1, wherein the engine is coupled to a hybrid vehicle including an electric machine.

7. The method of claim 6, wherein flowing ambient air includes, rotating the engine in an opposite direction using the electric machine.

8. The method of claim 1, wherein the ambient air collects soot from the PF and deposits soot on the air filter of the intake manifold.

9. The method of claim 5, wherein flowing ambient air is responsive to a pressure drop across the intake air compressor being higher than the pressure drop across a compressor recirculation valve.

10. The method of claim 2, further including routing air to the intake air filter via the compressor recirculation passage responsive to the pressure drop across the compressor recirculation valve being higher than the pressure drop across the intake air compressor.

11. The method of claim 1, further including reversing direction of rotation of the engine,
closing the EGR valve,
routing the ambient air from downstream of an exhaust turbine to downstream of an intake air compressor via one or more engine cylinders, and then
routing the ambient air from to the air filter via the compressor recirculation passage.

12. The method of claim 11, further comprising routing soot deposited on the air filter to one or more engine cylinders during a subsequent engine start and combusting the soot.

13. An engine method comprising:
during an engine-off condition;
flowing air from a tailpipe to an intake air filter;
removing particulate matter from an exhaust particulate filter (PF) using the flowing air;
depositing the particulate matter on the intake air filter using the flowing air; and
rotating one or both of an exhaust turbine and an intake air compressor in a reverse direction to flow the air.

14. The method of claim 13, wherein flowing air from the tailpipe to the intake air filter includes flowing air from the tailpipe to the intake air compressor via each of the PF, the exhaust turbine, and an exhaust gas recirculation (EGR) passage.

15. The method of claim 14, further comprising flowing air to the intake air filter via one of the intake air compressor and a compressor recirculation passage.

16. The method of claim 14, further comprising closing the compressor recirculation valve to flow air via the intake air compressor responsive to a pressure difference across the intake air compressor being higher than the pressure difference across a compressor recirculation valve; and opening the compressor recirculation valve to flow air via the compressor recirculation passage responsive to the pressure difference across the compressor recirculation valve being higher than the pressure difference across the intake air compressor.

17. A vehicle system, comprising:
an engine including one or more cylinders;
an intake manifold including an intake air filter;
a particulate filter (PF) coupled to an exhaust passage,
a turbocharger including a compressor and a turbine;
a compressor recirculation passage;
an exhaust gas recirculation (EGR) passage; and
a controller with computer readable instructions stored on non-transitory memory for:
responsive to an amount of soot deposited on the PF being higher than a threshold and a vehicle key-off condition,
routing air through the PF, and then through the intake air filter via either the EGR passage or the one or more cylinders, and one or more of the compressor and the compressor recirculation passage.

18. The vehicle system of claim 17, wherein the air is routed via either the EGR passage or the one or more cylinders, and one or more of the compressor and the compressor recirculation passage.

19. The system of claim 17, wherein one or more of the turbine, compressor or engine is rotated in a reverse direction to route the air.

20. The system of claim 17, wherein the controller contains further instructions for:
estimating mass air flow using a mass air flow sensor, and suspending rotation of one or more of the turbine, the compressor or the engine in response to a higher than threshold mass air flow.

* * * * *